Oct. 1, 1946.                F. F. FELDMANN                2,408,510
                             NUTCRACKING MACHINE
               Filed Nov. 22, 1943                2 Sheets-Sheet 1
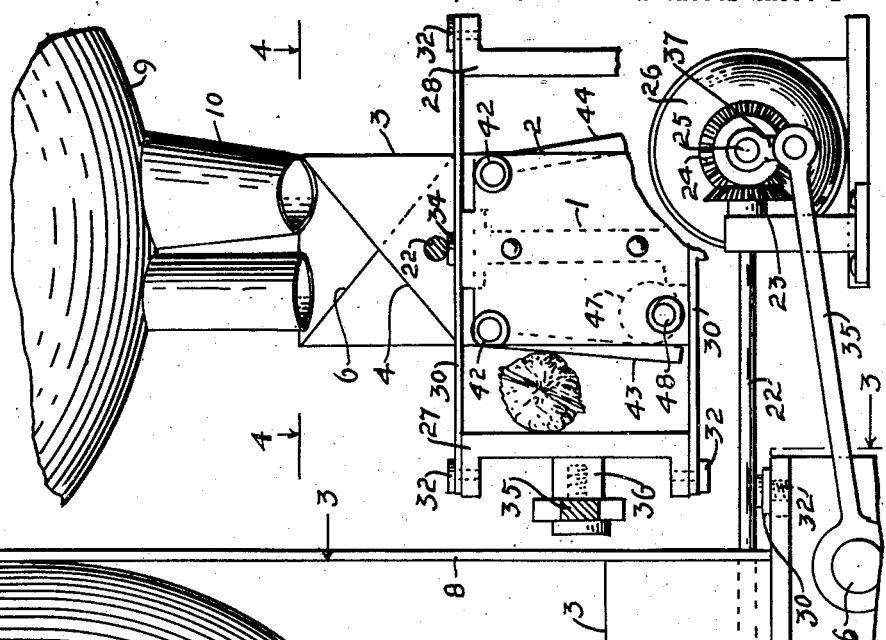
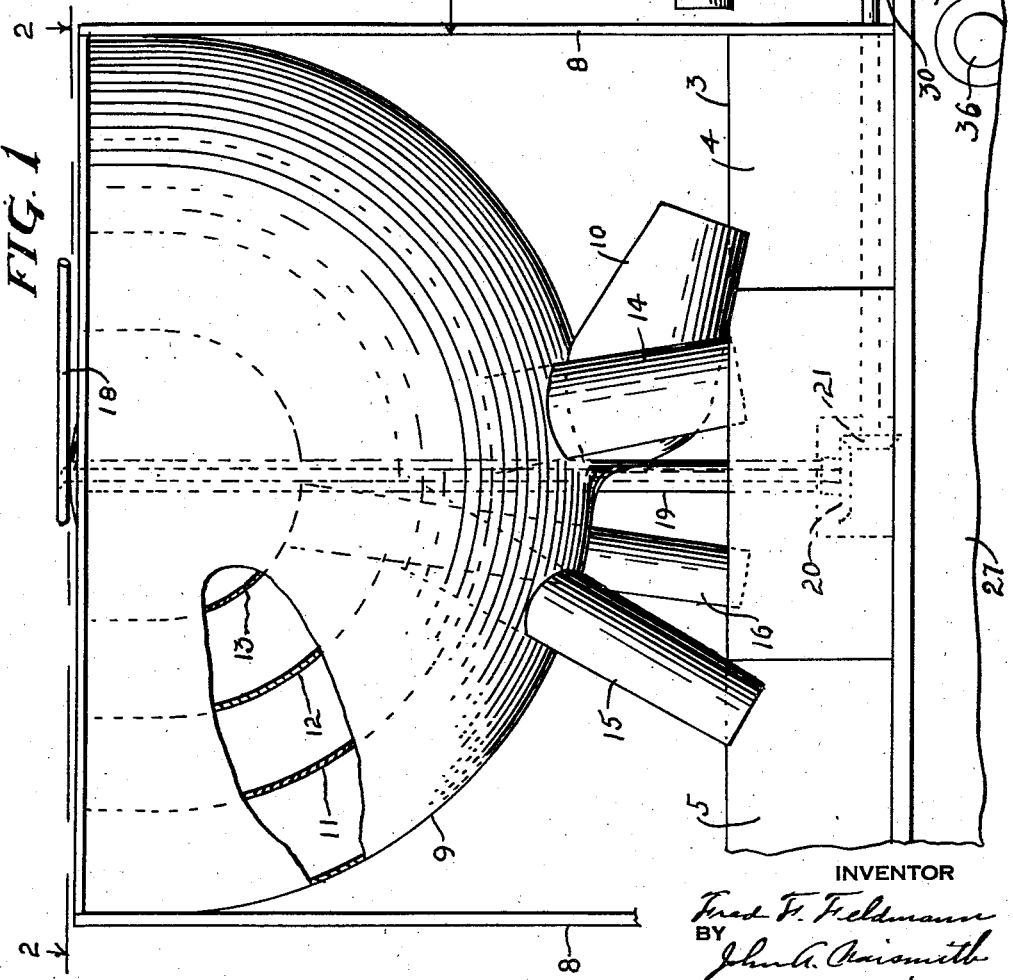
INVENTOR
Fred F. Feldmann
BY John A. Naismith
ATTY Oct. 1, 1946.　　　　F. F. FELDMANN　　　　2,408,510
NUTCRACKING MACHINE
Filed Nov. 22, 1943　　　　2 Sheets-Sheet 2

INVENTOR
Fred F. Feldmann
BY John A. Crainsmith
ATTY

Patented Oct. 1, 1946

2,408,510

UNITED STATES PATENT OFFICE 2,408,510

NUT CRACKING MACHINE

Fred F. Feldmann, San Jose, Calif.

Application November 22, 1943, Serial No. 511,370

1 Claim. (Cl. 146—12)

It is one object of the present invention to provide a machine of the character indicated that will receive a continuous flow of nuts of a suitable kind, grade them as to size, and crack a number of them at the same time.

It is another object of the invention to provide a machine constructed and arranged to roll the nut during the cracking operation in such a manner as to spread the cracking operation over a greater area than is ordinarily the case, and to increase the area of cracking by gradually increasing the pressure as the nut is rolled.

Finally, it is an object to provide a machine of the character indicated that will effectually crack an unusually high percentage of nuts without breaking up the meat therein; one that will be extremely simple in construction and operation; and one that will be economical to construct and operate, strong, durable, and highly efficient in its practical operation.

In the drawings:

Figure 1 is a side elevational view of a device embodying my invention, with parts broken away.

Figure 3 is a view taken on line 3—3 of Figure 1, parts being broken away.

Figure 2:
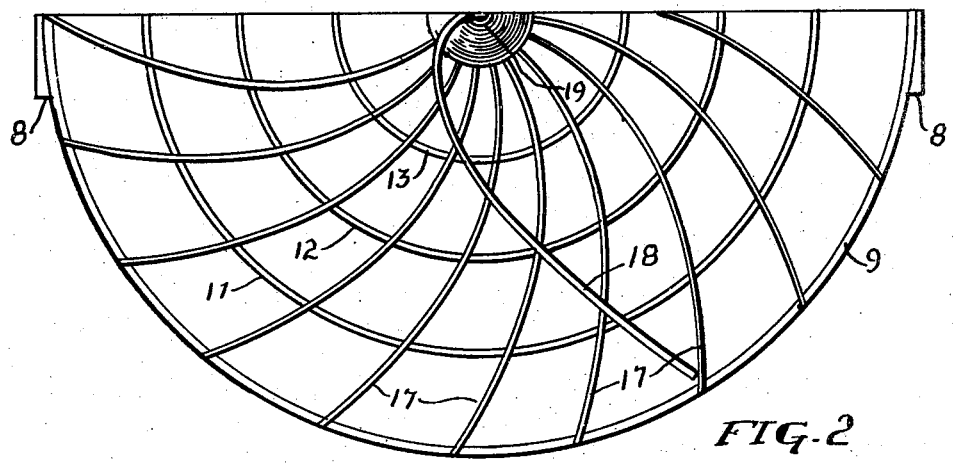
Figure 2 is a top plan view on line 2—2 of Figure 1 of one half of the grading structure.

The machine shown in the drawings comprises a base member 1, this member being an I beam fitted with end plates as at 2. On the member 1 is mounted an oblong block as 3 having its top surface formed to present two inclined surfaces as 4 and 5 sloping downwardly to one side, and two other inclined surfaces as 6 and 7 sloping downwardly to the other side.

Mounted on supports 8 arising vertically from the two ends of the block 3 is a hopper 9 discharging through chute 10 on to the inclined surface 4, said hopper in the present case being hemispherical in form and having its top edge lying in a horizontal plane, as shown. Concentrically mounted within said hopper 9 and with their top edges all lying in the same horizontal plane as the top edge of hopper 9, are three progressively smaller hoppers as indicated at 11, 12 and 13, suitably spaced from each other and provided with discharge chutes at 14, 15 and 16. The chute 16 passes through hoppers 9, 11 and 12 to discharge upon the inclined surface 7; the chute 15 passes through the hoppers 9 and 11 to discharge upon the inclined surface 5; and the chute 14 passes through the hopper 9 to discharge upon the inclined surface 6.

Disposed on the top edges of the several hoppers, and consequently lying in a horizontal plane, and extending outwardly from the center thereof, are a number of substantially radially disposed involutely curved elements as 17 to form a number of paths of travel for nuts deposited on the center. Since the spacing of these elements gradually increases toward the edge of the outer hopper, it follows that the smaller nuts will drop into the hopper 13 and thence through the chute 16 to the inclined surface 7; the nuts dropping into the next larger hopper 12 are discharged on to the surface 5, the larger nuts dropping into the next-to-the-largest hopper 11 and thence to surface 6; and the largest nuts dropping into the largest hopper 9 and thence to the inclined surface 4.

Since the nuts are deposited in any suitable manner upon the center of the grading device it is necessary to spread them over the same by means of some suitable mechanical device. For this purpose I provide a rod 18 positioned to overlie the grading surface and curved in the direction opposite to elements 17 as shown, and extending downwardly through a centrally disposed supporting tube 19 to the bottom portion of block 3 where it is fitted with a bevel gear 20. The gear 20 meshes with a bevel gear 21 on a shaft 22 journaled in block 3, the outer end of shaft 22 being provided with a bevel gear 23 which meshes with a bevel gear 24 on the shaft 25 of a motor 26. The result of this arrangement is that when the motor 26 is in operation the curved rod 18 is rotated about the center of the device and caused to push the nuts outwardly on the grader until they drop into the hoppers for which they are fitted.

Figure 4:
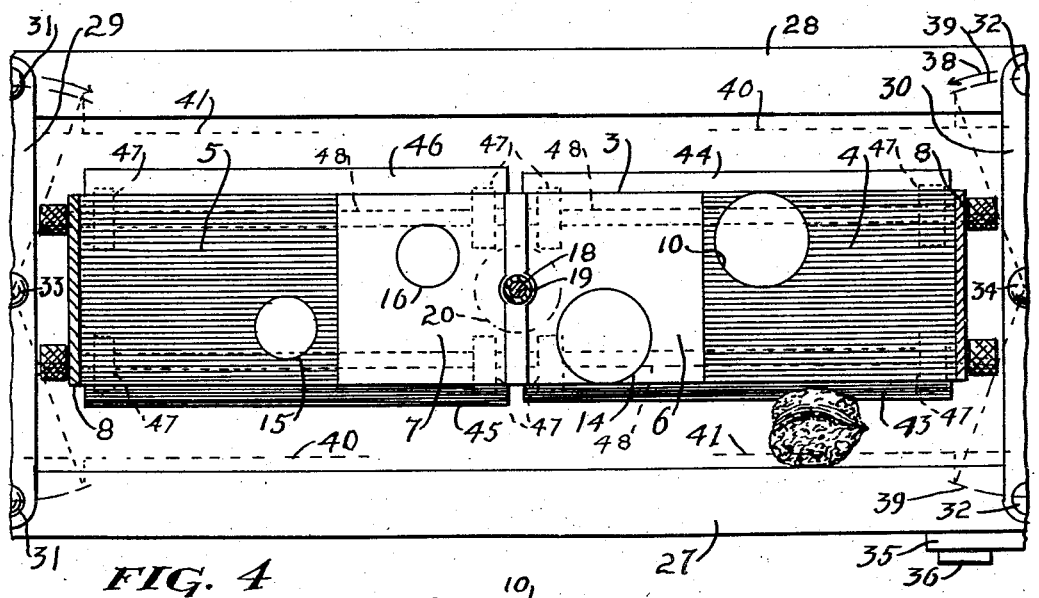
Figure 4 is a plan view on line 4—4 of Figure 3.
Figure 5:
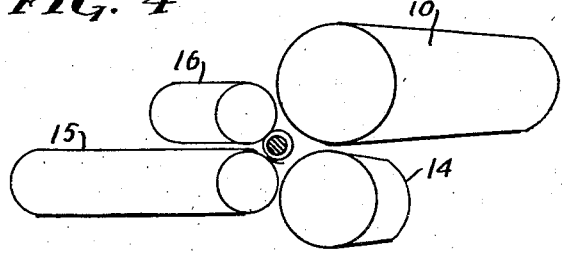
Figure 5 is a diagrammatical illustration of the nut feed chutes relative to the center of the machine.

From the several inclined surfaces the nuts roll down into the cracking mechanism which will now be described. Arranged along on opposite sides of the parts 1, 2 and 3 and in spaced relation thereto, are a pair of crushing plates as 27 and 28 joined by links 29 and 30 at their ends, the said links being pivotally attached to the plates as at 31 and 32, and also pivotally connected at the center to the centers of the end plates 2, as at 33 and 34. One of the plates, as 27, has a link 35 pivotally connected to one end thereof as at 36, the other end of the link being connected to a crank 37 on shaft 25 of motor 26. When the motor is in operation the plate 27 is reciprocated through the medium of the crank 37 and link 35. But since the plates 27—28 are connected by the links 29 and 30 which are in turn pivotally mounted at their centers on the base 1—2, it follows that the reciprocation of plate 27 will also effect the reciprocation of plate 28, at the same rate of speed but in the opposite direction. This mounting of the plates 27—28 causes them to be spaced furthest from the center base 1 when the links 29—30 are at right angles to the longitudinal plane of the base 1, as shown in solid lines in Figure 4, and to approach the said base when moved in either direction from said last mentioned position. If, for instance, the links 29—30 swing in the direction indicated by arrows 38, the pivots 32 move through the arc 39 and the working faces of the two plates 27—28 are swung to the position indicated in dotted lines at 40. When the movement is reversed and the links 29—30 swing in the opposite direction the working faces of the plates 27—28 are withdrawn from the plate 1 and then swung back toward the same to the position indicated in dotted lines at 41.

Opposite each plate 27—28, and swingably mounted in the base structure as at 42 are adjustable plates 43, 44, 45 and 46, each plate being adjusted about its pivotal mounting by means of cams as 47 on a rotatable shaft 48 and operating against its lower rear edge. This latter adjustment is desirable so that the space between the plates 27—28 and plates 43—44—45—46 may be quickly and accurately adjusted to the particular type of nut to be cracked.

Assuming that soft-shell walnuts are to be cracked preliminary trials will quickly indicate the exact setting for the several plates 43 to 46 with relation to the plates 27—28, the movement of said plates being determined by the length of the crank 37. Walnuts flowing upon the center of the grading device will quickly be distributed over the same by means of the rotating arm 18 and thereby be caused to drop into their proper hoppers. The nuts passing through hopper 9 and falling upon surface 4 roll down between plates 27 and 43. If plate 27 has just completed its crushing movement and starts to swing outwardly again the nut merely settles further down between the two plates, but when the plate swings inwardly again it travels in an arcuate path and simultaneously rolls the nut and increases its pressure thereon in such a manner as to crack it over a large area, and so permit complete removal of the shell without injury to the meat.

In this machine the nuts may flow continuously down between the crushing plates, and a large number may be cracked at each closing movement of the crushing plate, but since they are accurately graded as to size they all receive the same treatment, and drop into a waiting container ready for final cleaning. In moving from the extended position to the contracted position and back again the crusher plate rolls the nut twice, giving it a preliminary cracking and then a finishing cracking which completely releases the shell from the meat.

Having thus described my invention, what I claim as new and desire to secure by Letters Patent is:

In a machine for cracking nuts the combination of, a fixed horizontal supporting member, plates adjustable for vertical inclination mounted on each side of said member and means for effecting said adjustment, crusher plates disposed in spaced and opposed relation to said first mentioned plates, rocker arms pivotally mounted at their centers on said supporting member and pivotally connected at their ends to said crusher plates to support and actuate the same simultaneously, and means operative to actuate the rocker arms and crusher plates.

FRED F. FELDMANN.